United States Patent
Csillag

[11] Patent Number: 5,527,133
[45] Date of Patent: Jun. 18, 1996

[54] TOOL FOR A SEWER ROBOT

[76] Inventor: Robert Csillag, Litzibuechstrasse 14, CH-5610 Wohlen, Switzerland

[21] Appl. No.: 291,890

[22] Filed: Aug. 17, 1994

[51] Int. Cl.[6] .................................................. F16L 55/16
[52] U.S. Cl. ............................................ 405/154; 138/97
[58] Field of Search ................................. 405/303, 154, 405/155; 138/97, 98

[56] References Cited

U.S. PATENT DOCUMENTS

| | | | |
|---|---|---|---|
| 4,728,223 | 3/1988 | Rice | 405/154 |
| 5,040,922 | 8/1991 | Himmler | 405/154 X |
| 5,285,817 | 2/1994 | Sigel | 138/97 |

FOREIGN PATENT DOCUMENTS

| | | | |
|---|---|---|---|
| 3730315 | 3/1989 | Germany | 138/97 |
| 8204086 | 11/1982 | WIPO | 138/97 |
| 8605569 | 9/1986 | WIPO | 405/155 |

Primary Examiner—David J. Bagnell
Assistant Examiner—Frederick L. Lagman
Attorney, Agent, or Firm—Martin A. Farber

[57] ABSTRACT

The tool has a sheathing plate (34) having an outlet opening (39) for a spackling composition, to which outlet opening (39) a pressure line (12) for the forcing-in of a sealing composition can be connected. In order to reduce the time required for the repair process, there is provided, alongside the outlet opening (39), a second opening (43) which is closed off in air-tight and pressure-tight manner by an elastically deformable flat-shaped article (53) which can be inflated in the manner of a balloon; a chamber (50) adjoining the second opening (43) on the rear side; and the chamber (50) can be connected to a source of pressure in order to inflate the flat-shaped article (53) in the manner of a balloon.

2 Claims, 2 Drawing Sheets

TOOL FOR A SEWER ROBOT

FIELD AND BACKGROUND OF THE INVENTION

The present invention relates to a tool for a sewer robot for sealing-off the connection of a secondary sewer (36) to a main sewer (1), having a sheathing plate (34) which has an outlet opening (39) for a spackling composition, to which outlet opening a pressure line (12) for the forcing-in of a sealing composition can be connected.

From EP-C-396 696 it is known to seal off a subsidiary sewer leading into a non-man-size main sewer between the mouth of the former and the place of leakage by means of an inflated balloon. After the balloon has been put properly in place, the mouth of the secondary sewer is covered and closed off with a sheathing plate which is curved correspondingly to the diameter of the main sewer, whereupon the hollow space between the sheathing plate and the balloon is filled under pressure with a pasty flowable sealing composition. Thereupon, a hole corresponding to the inside diameter of the secondary sewer is cut by means of a cutter in the solid body which has thus been formed in the region of the mouth of the secondary sewer.

This procedure has various disadvantages. On the one hand, after the positioning of the balloon, the robot must be moved out of the main sewer and provided with a sheathing tool and then moved back again to the point of repair. Another disadvantage is that the balloon can be used only once, since it is destroyed in this process. Another disadvantage is that, after the hardening of the sealing composition, it is difficult for the operator again to find the center of the mouth of the secondary sewer in order to position the cutter head axially to the secondary sewer and advance it therein. Furthermore, in this process, a comparatively large amount of sealing composition must be pumped to the place which is to be repaired and milled out after it has hardened, which consumes a lot of material and time and increases the wear of the material and the tool.

SUMMARY OF THE INVENTION

The object of the present invention is to provide a tool of the aforementioned type which does not have the above-mentioned disadvantages.

The invention has the advantage that the repair can be carried out so rapidly that the house connecting line need no longer be shut off during the repair. After the removal of the sheathing plate together with the balloon and during the cutting-out of the place of the patch, the house waste water can again flow through the remaining opening formed by the balloon.

BRIEF DESCRIPTION OF THE DRAWINGS

With the above and other and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
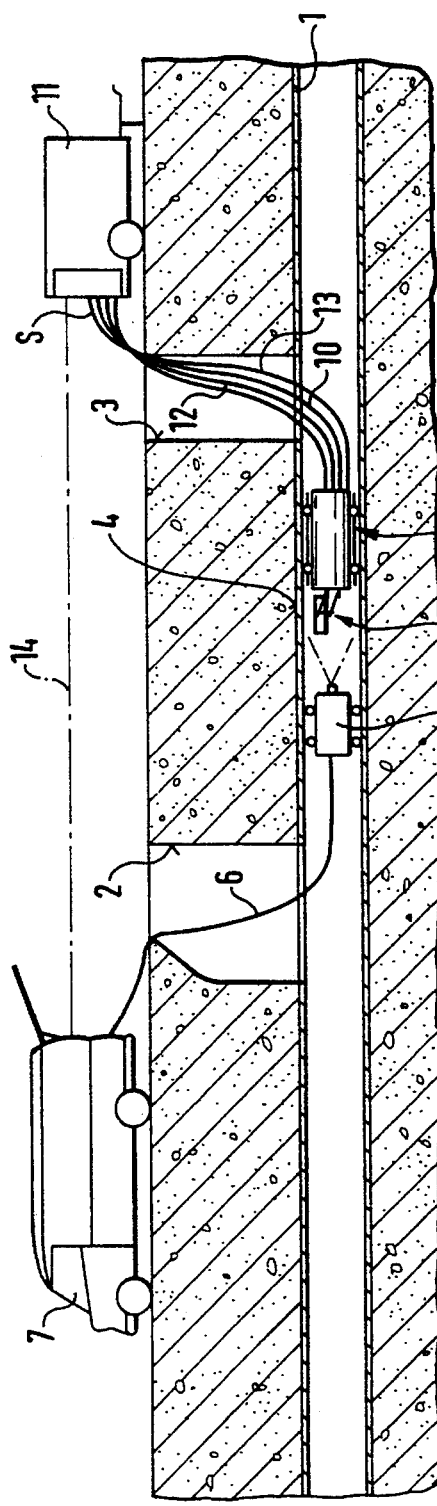
FIG. 1 shows a portion of a waste-water pipe system containing a repair device in the course of use.

In FIG. 1, 1 is a sewer pipe to which two inspection shafts 2 and 3 extend. The sewer pipe 1 has a leak 4 at the point of connection of a secondary line (for instance, a house connection pipe), the leak to be sealed-off having been located by means of a movable video camera 5.

The video camera 5 is a commercial product, sold, for instance, under the designation BCS 85 II by the BCS System AG of Zufikon. It is connected by a transmission and command line 6 to a control center 7 at which the work place of an operator which is equipped with a monitor is located. The operator observes there the pictures transmitted by the camera 5 and from his position controls, by means of a control device, via the transmission and command line 6, among other things, the forward and return travel of the camera 5, its lens focal length and head lights present on the camera for illuminating the leakage points 4. Opposite the camera 5, spaced from it, there is arranged within the pipe 1 a robot 8 which is aligned axially to the longitudinal axis of the pipe and is provided with a tool 9 for acting on the leakage point 4. The robot 8 is driven with compressed air, which is fed, over a compressed-air line 10, from a source of compressed air (not shown) arranged on a vehicle 11. A second pressure line 12 provides the tool 9 with a pasty patching composition. This composition is prepared in a preparation plant (not shown) arranged on the vehicle 11, and is forced by a screw pump into the pressure line 12. As patch composition, synthetic resins, quick-setting mortars, and the like can be used. Parallel to the lines 10, 12 there is also an electric supply line S and a pressure line 13 which is connected to a compressed-air vacuum source present on the vehicle 11. If the source of compressed air, the patch-composition preparation plant, and the screw pump are adapted to be driven by motor, their drive units can be remotely controlled by the operator via a control line 14 which leads to the control device of the control center 7.

After the introduction of the camera 5 and the robot 8 into the pipe 1 through the inspection shafts 2 and 3, the operator takes his place in the control center 7 and, from his position, guides the camera 5 and the robot 8 towards the point of leakage 4, where he carries out the required repair work. If the point of leakage 4 is, as mentioned, a defective connection of a house connection pipe, the robot 8 is first of all equipped with a milling cutter and the point of leakage 4 is freed of fragile material. The robot 8 is then removed from the pipe 1 and the milling cutter is replaced (as described below) by a tool 9 in accordance with the invention, and lines 12 and 13 for the patching composition and the pressure/vacuum fluid are connected. The robot 8 is now again introduced into the pipe 1 through the inspection shaft 3 for the repair of the place of leakage 4 and advanced up to the place of leakage 4. After the sealing-off of the place of leakage 4, the robot is re-equipped with a milling and/or grinding tool, and possibly a spray-water cleaning nozzle, in order accurately to calibrate, finely machine, or clean the place of patch.

A set of compressed-air hoses 12 of different length is preferably present on the vehicle 11. This has the advantage that the length of the pressure line can be selected in accordance with the distance of the point of leakage 4 from the vehicle 11. By the selection of the shortest possible pressure line 12, the pressure drop and the amount of patching material remaining in the pressure line 12 after the spackling can be kept small. Similarly, in this way the cleaning of the pressure line 12 is simplified.

Figure 2:
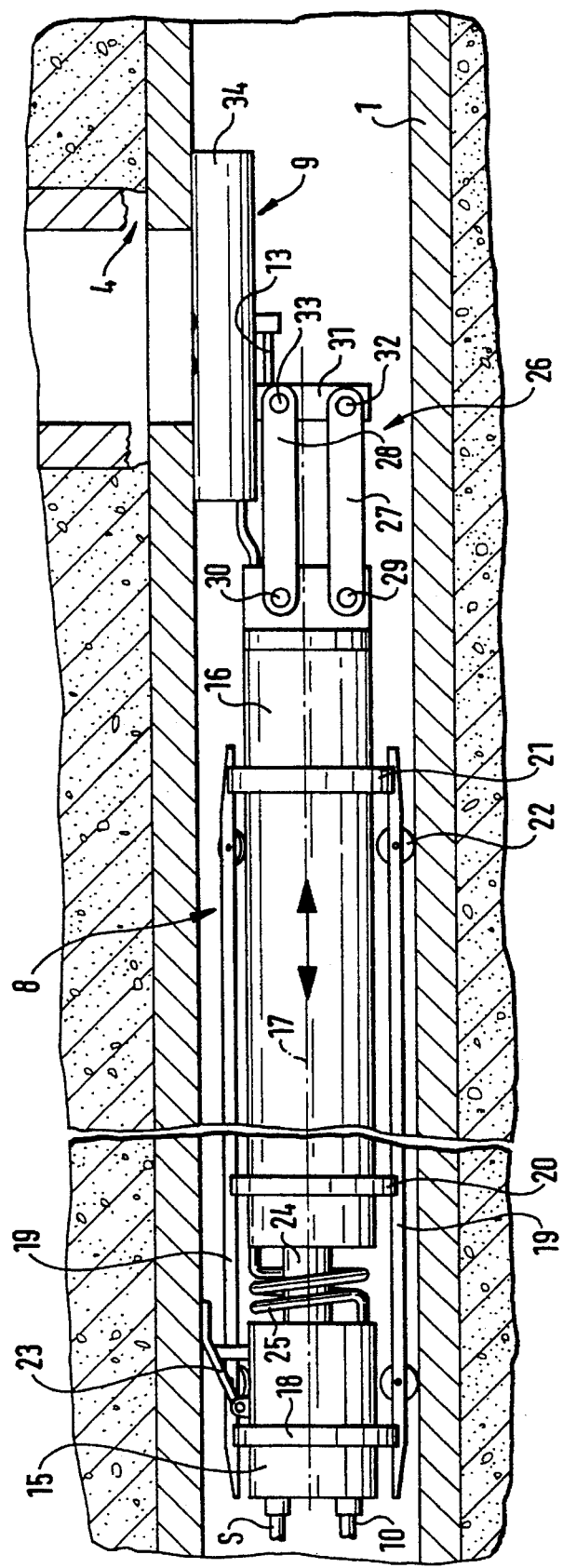
FIG. 2 is a portion of FIG. 1 showing the robot of the repair device on a larger scale.

FIG. 2 shows a known robot (BJR Trading, DK-Roskilde, Type Bearer Cutter) having a part 15 which can be locked in position relative to the pipe 1 and a movable part 16 which is displaceable relative to the lockable part 15 in the direction of the longitudinal axis 17 and is turnable around said axis. On the lockable part 15 there is firmly attached a ring 18 to which several longitudinal bars 19 are fastened spaced with radial symmetry apart from each other with respect to the axis 17. Two additional rings 20 and 21 are firmly attached coaxially to the longitudinal bars 19, spaced from the ring 18. The rings 18, 20, 21 and the longitudinal bars 19 form a cage. Between the rings 18, 20, 21 and the longitudinal bars 19, replaceable spacers are provided so that the outside diameter of the cage can be adapted to the inside diameter of the pipe 1, and the robot 8 can be aligned axially with the longitudinal axis 17 of the pipe 1. In the longitudinal bars 19, which can be used as skids, there are, however, arranged preferably freely rotatable or drivable rollers 22 which reduce the force required for displacement of the robot 8 in the pipe 1. The lockable part 15 has, distributed with radial symmetry around the axis 17, at least two pneumatically actuatable locking levers 23 which can be clamped pneumatically against the inner wall of the pipe and serve to fix the part 15 at a given place in the pipe 1.

The lockable part 15 furthermore has a stationary axial piston rod 24 on which the movable part 16 is mounted with axial displacement in the manner of a movable piston. For the axial guidance, it is furthermore provided with a cylindrical outer shell in which the two rings 20 and 21 are slidingly mounted. A flexible helical pressure line 25 connects the two parts 15 and 16 and feeds, inter alia, the pneumatic motors for the movement of translation and rotation of the movable part 16 and, furthermore, the tool 9 and a swing device 26 which connects the tool with the movable part 16.

By the swing device 26, the tool 9 can be swung transverse to the axis 17. The swing device 26 is a parallel crank drive having a pair of cranks 27 and a pair of rocker arms 28. In FIG. 2, only the front crank and front rocker arm of the crank pair 27 and rocker-arm pair 28 are visible. The crank pair 27 is fixed on a shaft 29 which is rotatably mounted in the movable part 16, and, as already mentioned, can be driven by a pneumatic motor arranged in the part 16. The pair of rocker arms 28 is mounted for free swinging on a pin 30 which is arranged on the movable part 16 parallel to the shaft 29. The coupler of the parallel crank drive forms an adapter plate 31 which is part of the tool 9. The pair of cranks 27 and the pair of rocker arms 28 are pivoted on pivot pins 32, 33 which can be screwed into the adapter plate 31. Upon a rotation of the shaft 29, the tool 9 is moved in direction parallel to the shaft 17 towards the inner wall of the pipe and/or away from it. The swing device 26 can, however, also be designed as a construction kit with interchangeable pairs of cranks and rocker arms of different length. In this way, a four-bar mechanism with crank and rocker-arm pairs 27, 28 of different length can be assembled, the length ratio being preferably so selected that the inclination of the center line of the milling cutter 34 in operating position with respect to the axis 17 is 45°. This development of the swing device 26 is particularly suitable for the milling out of inclined pipe connections.

The pivot pins 32, 33 are detachably screwed to the adapter plate 31, so that, in case of need, the entire tool 9 can be removed or replaced by a different tool.

Figure 3:
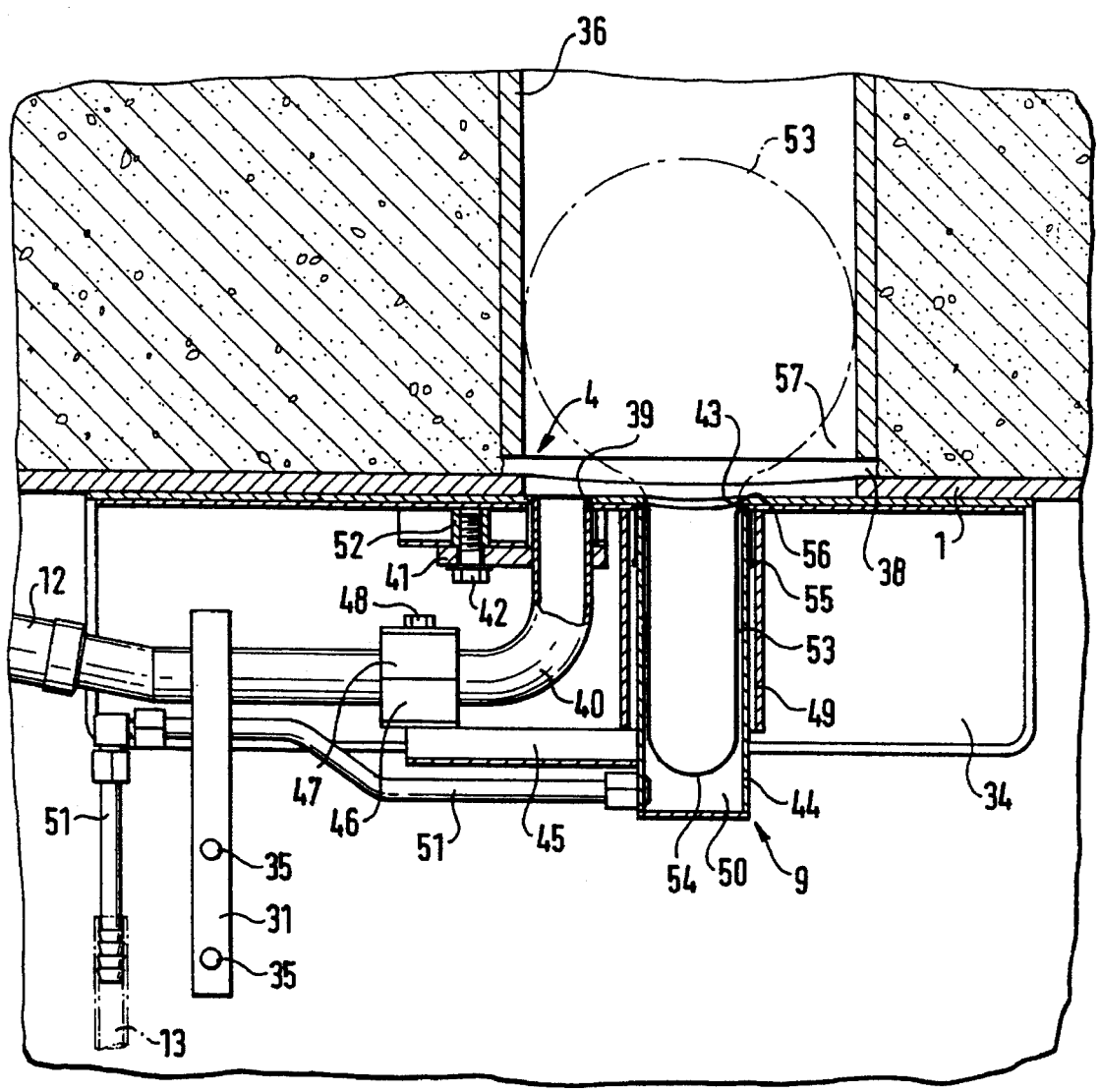
FIG. 3 shows a portion of FIG. 2 on an even larger scale.

To the sewer pipe 1 there is connected a house connection pipe 36 the connection of which to the sewer pipe 1 is broken. Sewage water can emerge through the break 38 forming the leakage place 4. This place must therefore be permanently sealed. The construction of the tool 9 suitable for this purpose is described below with reference to FIG. 3. This tool 9 has a sheathing plate 34 which is firmly attached to the adapter plate 31. The latter is provided with threaded holes 35 into which the pivot pins 32, 33 (FIG. 2) can be screwed. The sheathing plate 34 has a cross section of the shape of a circular segment with a radius of curvature which is the same as the inside radius of the sewer pipe 1.

The sheathing plate 34 is provided, in the region of the mouth of the house connection 36, with an opening 39 within which there terminates a pressure pipe 40 to which the pressure line 12 for the feeding of the fluid sealing composition is connected. For the fastening of the pressure pipe 40, a plate 41 through which a hole for a screw 41 extends is welded on said pipe 40 protruding transversely from it. The screw 42 which is screwed into a threaded sleeve 52 welded on the inside to the sheathing plate 34 attaches the plate 41 firmly to the sheathing plate 34. The pressure pipe 40 which passes through the adapter plate 31 and is welded to it is also firmly attached to the sheathing plate 34 by the adapter plate 31.

Alongside the opening 39, the sheathing plate 34 has a second opening 43 which forms, on the inner side of the sheathing plate, a circular sealing seat for the open end of a closed sleeve 44 of annular cylindrical cross section. On the sleeve 44, there is fastened a radially protruding web 45 on the outer end of which a half-shell 46 which partially surrounds the pressure pipe 40 is fastened. The half shell 47 which is complementary to the half shell 46 is screwed by a screw 48 from the opposite side of the pressure pipe against the half shell 46 so that the latter is pulled together with the web 45 against the pressure pipe 40. Corresponding to the initial stress applied to the web 45 by the screw 48, the open end of the sleeve 44 is pressed into the sealing seat of the opening 43. A protective sleeve 49 welded to the sheathing plate 34 axially surrounds the sleeve 44.

The sleeve 44 forms a pressure and vacuum chamber 50 to which a pressure-tight and vacuum-tight pipeline 51 is connected. The aforementioned pressure line 12 is connected to the pipeline 51.

The open end of the sleeve 44 is closed in pressure-tight and vacuum-tight manner by an elastic, hose-like membrane 53. The free end 54 of the membrane 53 is closed and lies in position of rest (shown in solid dashes) within the sleeve 44. The open end of the membrane is turned down towards the outside over the open end of the sleeve 44 and is pressed radially against the outside of the sleeve by means of a clamp 55. By the axial clamping force produced by the screw 48 on the sleeve 44, the annular edge 56 of the membrane 53, which edge lies on the free end of the sleeve 44, is pressed on the sealing seat, which, so to speak, forms an elastic sealing ring.

If a pressure fluid is forced into the pressure and vacuum chamber 50 through the pipeline 51, the membrane 23 moves out of the sleeve 44 and widens in balloon shape in front of the sheathing plate 34 (shown in dash-dot line).

If, on the other hand, when the membrane 53 forms a balloon in front of the sheathing plate 34, the pressure-vacuum chamber 50 is acted on by vacuum via the line 51, the balloon collapses and is drawn back into the sleeve 44.

For the closing of the break 38 (possibly after prior cleaning away of broken material, deposits, or dirt from the place of leakage 4) the robot 8 is moved within the sewer pipe 1 up to the house connection pipe 34 in such a manner that the two openings 39 and 43 of the sheathing plate 34 lie in front of the mouth of the house connection pipe 36. The sleeve 44 is aligned essentially axially to the house connection pipe 36. Thereupon, the sheathing plate 34 is pressed against the wall of the sewer pipe 1 so that it shuts off the mouth of the house connection pipe 36. Thereupon, a pressure fluid acts on the chamber 50 from a pressure-vacuum source via the pressure line 13 and the pipeline 51, and the membrane is pushed outward and inflated until it seals the house connection pipe 36 off on the other side of the break 38.

The membrane 53 and the sheathing plate 34 now, together with the house connection pipe 36, seal off an annular hollow space 57 in the region of the break 38. Thereupon, a pasty fluid sealing composition is forced under pressure into the hollow space 57 through the pressure line 12 and the pressure pipe 40. The sealing composition passes through the break 38 and fills it completely. After the at least partial hardening or setting of the sealing composition, the pressure and vacuum chamber 50 is acted on by vacuum and the membrane 53 is drawn back into the sleeve 44.

The robot 8 can now be removed from the sewer pipe 1 and the tool 9 can be replaced by a milling cutter. After the complete hardening of the sealing composition, the mouth of the house connection pipe 36 can be milled to its nominal diameter. In this connection, the opening left free by the membrane 53 into the house connection pipe 36 forms an exact fix for the operator for the placing-on of the milling head.

I claim:

1. A tool for a sewer robot for sealing-off connection of a secondary sewer to a main sewer, comprising a sheathing plate which has an outlet opening for a spackling composition to which outlet opening a pressure line for forcing-in a sealing composition can be connected;

alongside the outlet opening, there is a second opening which is connected in air-tight and pressure-tight manner by an elastically deformable flat-shaped article which can be inflated in a manner of a balloon;

a chamber adjoining the second opening on the rear side;

the chamber can be connected to a source of pressure in order to inflate the flat-shaped article in the manner of a balloon;

the flat-shaped article is fastened replaceably to the sheathing plate;

the chamber is formed by a sleeve which is detachably attached to the sheathing plate and is closed off at one end by the flat-shaped article; and the end of the sleeve can be clamped with the flat-shaped article axially against the edge of the second opening.

2. A robot for sealing-off connection of a secondary sewer to a main sewer, comprising a tool which has a sheathing plate which is provided with an outlet opening, to which outlet opening a pressure line for forcing-in a sealing composition can be connected; alongside the outlet opening, there is a second opening which can be closed off in air-tight and pressure-tight manner by an elastically deformable flat-shaped article which can be inflated in a manner of a balloon; on the rear side a chamber adjoins the second opening; the chamber can be connected with a source of pressure in order to inflate the flat-shaped article in the manner of a balloon; the chamber is formed by a sleeve which is detachably attached to the sheathing plate and is closed-off at one end by the flat-shaped article; and the end of the sleeve can be clamped with the flat-shaped article axially against the edge of the second opening.

* * * * *